(12) United States Patent
Yasuma et al.

(10) Patent No.: US 10,237,323 B2
(45) Date of Patent: Mar. 19, 2019

(54) COMMUNICATION APPARATUS, COMMUNICATION METHOD, COMMUNICATION SYSTEM, AND STORAGE MEDIUM

(71) Applicant: CANON KABUSHIKI KAISHA, Tokyo (JP)

(72) Inventors: Kensuke Yasuma, Tokyo (JP); Yukio Numakami, Kawasaki (JP); Tomoya Sakai, Kawasaki (JP); Makoto Kunimatsu, Tokyo (JP); Kazuya Taniguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 149 days.

(21) Appl. No.: 15/232,252

(22) Filed: Aug. 9, 2016

(65) Prior Publication Data

US 2017/0048281 A1 Feb. 16, 2017

(30) Foreign Application Priority Data

Aug. 12, 2015 (JP) ................. 2015-159483

(51) Int. Cl.
*G06F 15/16* (2006.01)
*H04L 29/06* (2006.01)
*H04L 12/807* (2013.01)
*H04L 12/835* (2013.01)

(52) U.S. Cl.
CPC .............. *H04L 65/80* (2013.01); *H04L 47/27* (2013.01); *H04L 47/30* (2013.01)

(58) Field of Classification Search
CPC .......... H04L 65/80; H04L 47/27; H04L 47/30
USPC ........................................... 709/227
See application file for complete search history.

(56) References Cited

U.S. PATENT DOCUMENTS

| | | | |
|---|---|---|---|
| 2007/0058937 A1* | 3/2007 | Ando ................... | G11B 27/105 386/248 |
| 2007/0177466 A1* | 8/2007 | Ando ................... | G11B 27/105 369/13.01 |
| 2011/0044338 A1* | 2/2011 | Stahl .................... | H04L 1/1607 370/392 |

FOREIGN PATENT DOCUMENTS

JP          2014-90367 A          5/2014

\* cited by examiner

*Primary Examiner* — Kristie D Shingles
(74) *Attorney, Agent, or Firm* — Canon U.S.A., Inc. I.P. Division (57) ABSTRACT

A communication apparatus establishes a connection and at least one stream for communication with another communication apparatus, determines a first window size relating to a buffer size for the connection and a second window size relating to a buffer size for the at least one stream based on communication information about communication between the communication apparatus and the other communication apparatus, and transmits to the other communication apparatus the first and second WINDOW_UPDATE frames.

15 Claims, 10 Drawing Sheets

| STREAM ID | NECESSARY WINDOW SIZE (K byte) | CURRENT WINDOW SIZE (K byte) | SIZE OF WINDOW_UPDATE (K byte) |
|---|---|---|---|
| id=0 | 500 | 64 | 436 |
| id=1 | 5 | 64 | – |
| id=3 | 95 | 64 | 31 |
| id=5 | 400 | 64 | 336 |

| STREAM ID | NECESSARY WINDOW SIZE (K byte) | CURRENT WINDOW SIZE (K byte) | SIZE OF WINDOW_UPDATE (K byte) |
|---|---|---|---|
| id=0 | 500 | 64 | 436 |
| id=1 | 5 | 64 | - |
| id=3 | 95 | 64 | 31 |
| id=5 | 400 | 64 | 336 |

COMMUNICATION APPARATUS, COMMUNICATION METHOD, COMMUNICATION SYSTEM, AND STORAGE MEDIUM

BACKGROUND OF THE INVENTION

Field of the Invention

The present invention relates to a communication apparatus configured to perform communication via a communication path, a communication method, a communication system, and a storage medium.

Description of the Related Art

It is common for a client device (hereinafter, "client") to connect to a remote server via a network to upload images. At this time, an application of the client is connected to the remote server using the Hypertext Transfer Protocol (HTTP). At the time of the connecting to the remote server, if a buffer size is not set as appropriate, there arises an issue that a communication band cannot be used effectively. To overcome the problem, a method has been discussed in which a congestion window size is adjusted based on the measurement of a round trip time (RTT) and the cause of a packet loss (Japanese Patent Application Laid-Open No. 2014-90367).

The Internet Engineering Task Force (IETF) has submitted HTTP version 2 (HTTP/2), which is the successor of HTTP/1.1. In HTTP/2, a window size corresponding to a buffer for performing data transmission/reception is set with respect to both a connection and a stream. In HTTP/2 communication based on an initial window size, a communication band may not be used effectively.

For example, in a case where the technique discussed in Japanese Patent Application Laid-Open No. 2014-90367 is applied to HTTP/2, a Transmission Control Protocol (TCP) congestion window size can be adjusted. However, the HTTP/2 connection and stream window sizes are not set, so that effective use of a band in the communication is not possible. This may cause a delay in uploading of images from a client to a server and in downloading images from the server to the client.

For example, in an environment with a delay (RTT) of 30 ms with respect to a window size of 16 kilobytes, the maximum bandwidth is 16 Mbps. Thus, the bandwidth-use efficiency may decrease under high-speed lines such as common wireless lines of IEEE 802.11n and IEEE 802.11ac standards, cable television lines, optical lines, etc.

SUMMARY OF THE INVENTION

According to an aspect of the present invention, a communication apparatus includes a connection establishment unit configured to establish a connection for communication with another communication apparatus, a stream establishment unit configured to establish at least one stream for communication with the other communication apparatus based on the connection established by the connection establishment unit, a determination unit configured to determine a first window size relating to a buffer size for the connection and a second window size relating to a buffer size for the at least one stream based on communication information about communication between the communication apparatus and the other communication apparatus, a generation unit configured to generate, based on the first window size determined by the determination unit, a first WINDOW_UPDATE frame for updating the buffer size of the other communication apparatus for the connection, and to generate, based on the second window size determined by the determination unit, a second WINDOW_UPDATE frame for updating the buffer size of the other communication apparatus for the at least one stream as well, and a transmission unit configured to transmit to the other communication apparatus the first and second WINDOW_UPDATE frames generated by the generation unit.

Further features of the present invention will become apparent from the following description of exemplary embodiments with reference to the attached drawings.

DESCRIPTION OF THE EMBODIMENTS

Various exemplary embodiments of the present invention will be described below with reference to the drawings.

Figure 1:
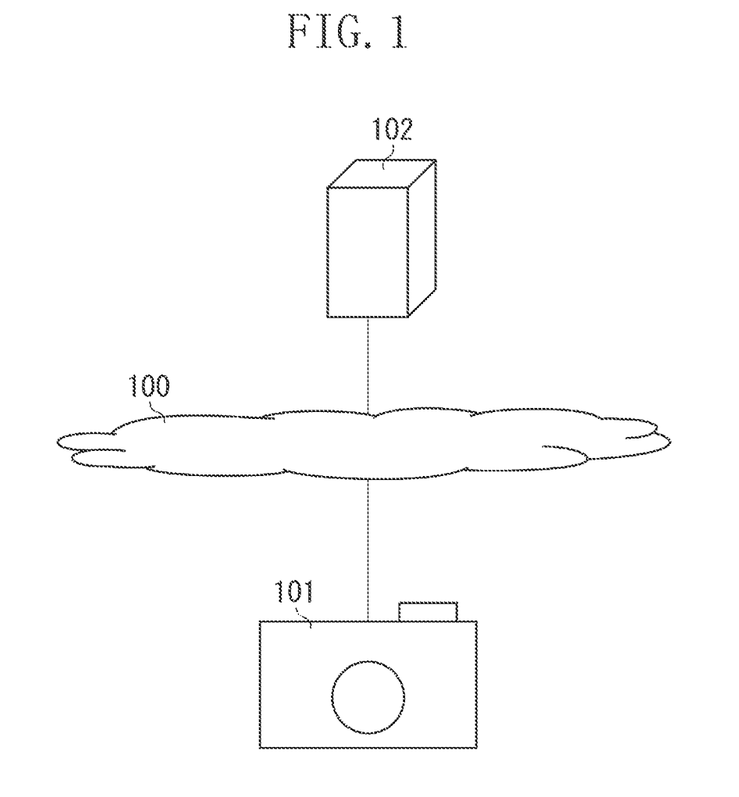
FIG. 1 illustrates a configuration example of a communication system according to an exemplary embodiment of the present invention.

FIG. 1 illustrates a configuration example of a communication system according to an exemplary embodiment of the present invention. In the present exemplary embodiment, a communication apparatus 101 and a counterpart apparatus 102 (another communication apparatus 102) are connected to a network 100, and the communication apparatus 101 performs Hypertext Transfer Protocol version 2 (HTTP/2) communication with the counterpart apparatus 102 via the network 100. Examples of the network 100 include the Internet, a wide area network (WAN), a local area network (LAN), and a combination thereof. The communication apparatus 101 may communicate with the counterpart apparatus 102 via a proxy server.

Figure 2:
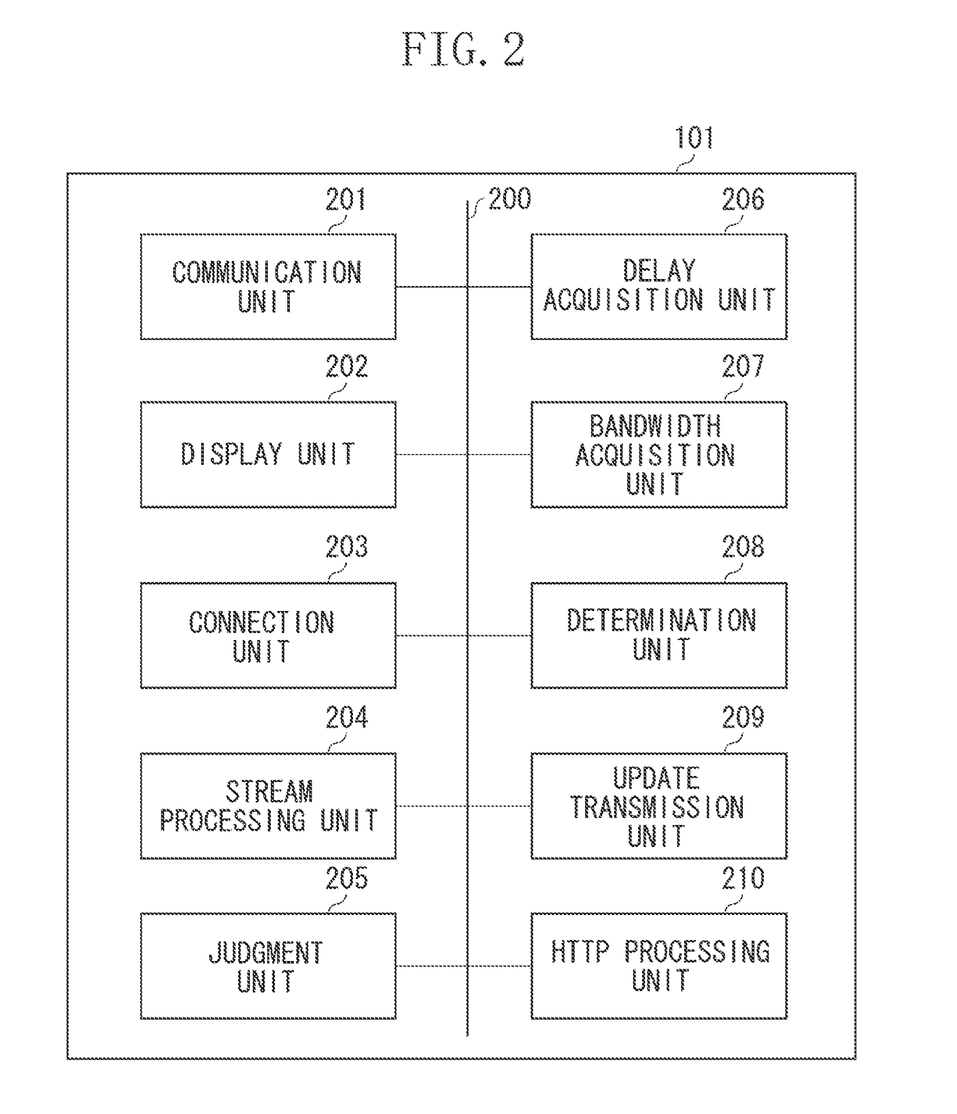
FIG. 2 illustrates a functional configuration example of the communication apparatus according to an exemplary embodiment of the present invention.

FIG. 2 illustrates a functional configuration example of the communication apparatus 101 according to the present exemplary embodiment. The communication apparatus 101 includes a communication unit 201, a display unit 202, a connection unit 203, a stream processing unit 204, a judgment unit 205, a delay acquisition unit 206, a bandwidth acquisition unit 207, a determination unit 208, an update transmission unit 209, and an HTTP processing unit 210. The foregoing functional units 201, 202, 203, 204, 205, 206, 207, 208, 209, and 210 are communicably connected to each other via a bus 200.

The communication unit 201 performs Transmission Control Protocol over Internet Protocol (TCP/IP) control. The display unit 202 displays contents and errors. The connection unit 203 generates an HTTP/2 connection as a communication path to connect to the counterpart apparatus 102. The stream processing unit 204 is a processing unit configured to establish a logical stream on the HTTP/2 connection to perform communication using the stream. The judgment unit 205 judges whether to transmit a connection WINDOW_UPDATE and a stream WINDOW_UPDATE to the counterpart apparatus 102. WINDOW_UPDATE is a window update frame for updating a window size.

The delay acquisition unit 206 measures a delay between the communication apparatus 101 and the counterpart apparatus 102. The bandwidth acquisition unit 207 acquires a communication bandwidth between the communication apparatus 101 and the counterpart apparatus 102. The determination unit 208 determines a connection window size and a stream window size by use of the delay measured by the delay acquisition unit 206 and the bandwidth acquired by the bandwidth acquisition unit 207. The determination unit 208 may determine a window size by use of, for example, a band necessary for the communication of a moving image application, together with communication information such as a delay and a bandwidth.

The update transmission unit 209 transmits a connection WINDOW_UPDATE and a stream WINDOW_UPDATE. The HTTP processing unit 210 performs processing with regard to HTTP/2. For example, the HTTP processing unit 210 performs frame processing, header and body processing, processing of methods such as HTTP GET and HTTP PUT, etc. that are defined by HTTP/2.

Figure 3:
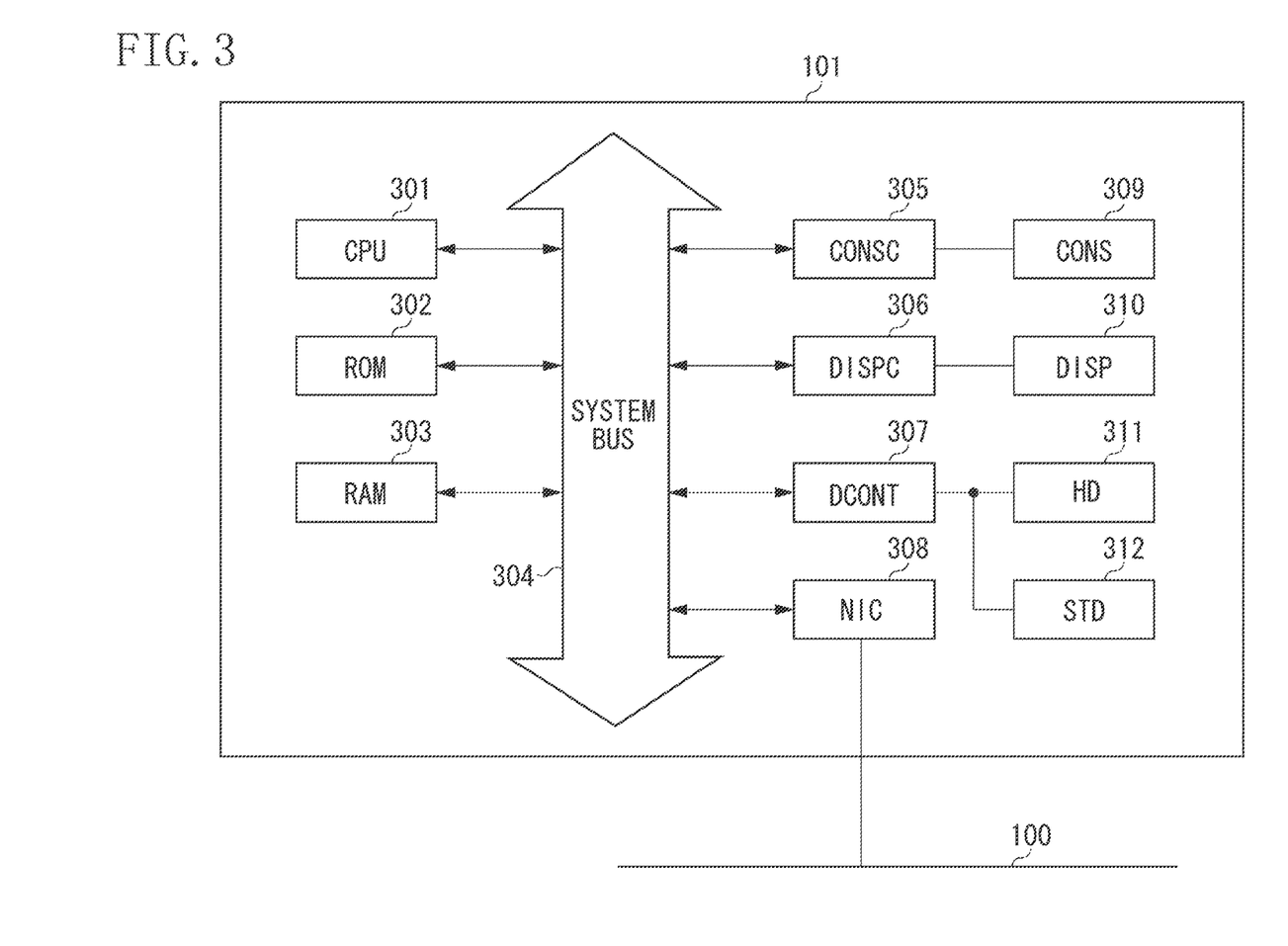
FIG. 3 illustrates a hardware configuration example of the communication apparatus according to an exemplary embodiment of the present invention.

FIG. 3 illustrates a hardware configuration example of the communication apparatus 101 according to the present exemplary embodiment. The communication apparatus 101 includes a central processing unit (CPU) (processor) 301, a read-only memory (ROM) 302, and a random access memory (RAM) 303. The communication apparatus 101 further includes a controller (CONSC) 305 of an operation unit (CONS) 309 and a display controller (DISPC) 306 of a display (DISP) 310 serving as a display unit.

The communication apparatus 101 further includes a controller (DCONT) 307 of a hard disk (HD) 311 and of a storage device (STD) 312 such as a flexible disk, and a network interface card (NIC) 308. The foregoing functional units 301, 302, 303, 305, 306, 307, and 308 are communicably connected to each other via a system bus 304.

The CPU 301 executes software stored in the ROM 302 or the HD 311, or software supplied by the STD 312 to comprehensively control each of the functional units connected to the system bus 304. Specifically, the CPU 301 reads a processing program from the ROM 302, the HD 311, or the STD 312 and executes the processing program to perform control so that operations according to the present exemplary embodiment are realized. The RAM 303 functions as a main memory, or a work area of the CPU 301.

The CONSC 305 controls input of an instruction from the CONS 309. The DISPC 306 controls a display on the DISP 310. The DCONT 307 controls access to the HD 311 and the STD 312, which store a boot program, various types of applications, user files, network management programs, and processing programs for realizing operations according to the present exemplary embodiment. The NIC 308 performs two-way data transmission and reception to and from another apparatus (e.g., the counterpart apparatus 102) on the network 100.

Figure 4:
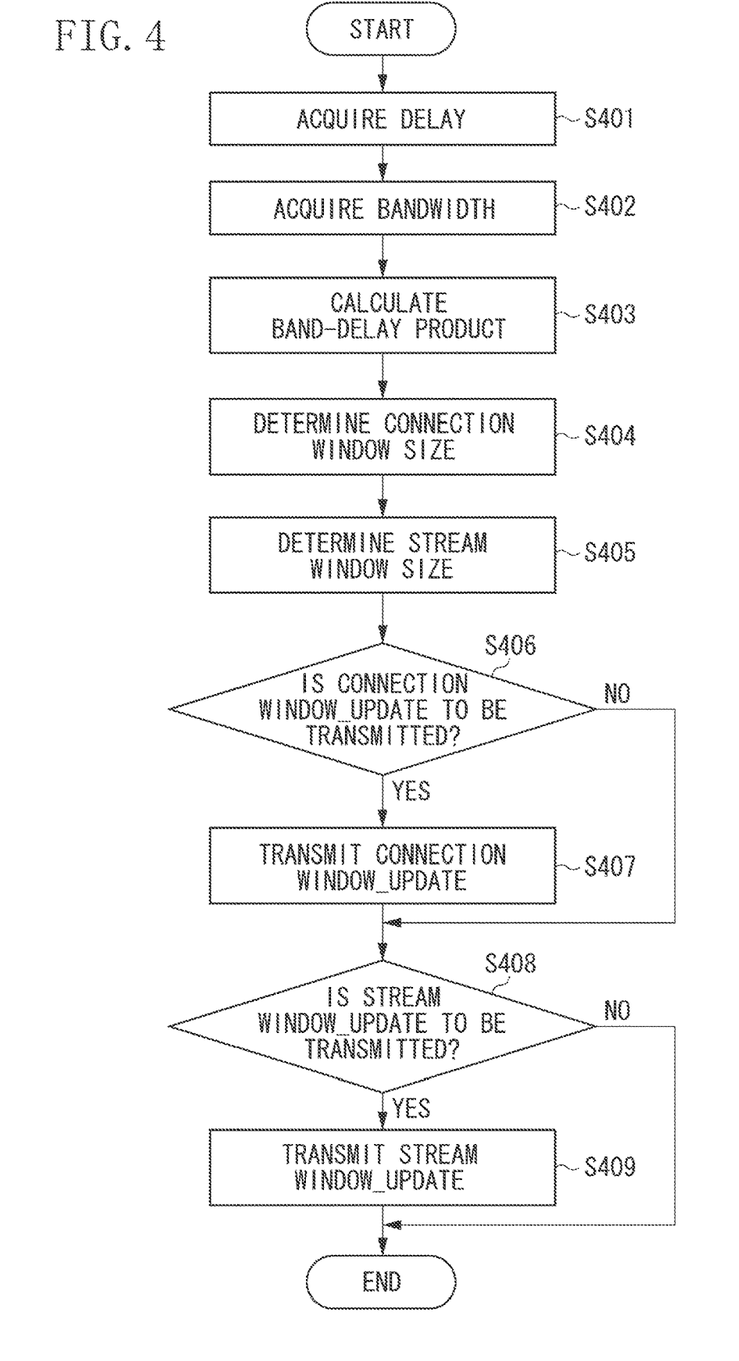
FIG. 4 is a flowchart illustrating an operation example of the communication apparatus according to an exemplary embodiment of the present invention.

FIG. 4 is a flowchart illustrating an example of operations of the communication apparatus 101 according to the present exemplary embodiment. FIG. 4 illustrates an example of processing to be performed when the communication apparatus 101 starts HTTP/2 communication. An HTTP connection has been established between the communication apparatus 101 and the counterpart apparatus 102, and a protocol upgrade by Application Layer Protocol Negotiation (ALPN) has been completed. Further, the communication apparatus 101 has transmitted HTTP GET to the counterpart apparatus 102 to request acquisition of image contents.

In step S401, the delay acquisition unit 206 of the communication apparatus 101 acquires a delay between the communication apparatus 101 and the counterpart apparatus 102. The delay acquisition unit 206 may measure the delay by transmitting a packet for measuring the delay between the communication apparatus 101 and the counterpart apparatus 102, or may measure the delay based on the Transmission Control Protocol (TCP) three-way handshaking or HTTP/2 transmitted/received packets. Further, the delay acquisition unit 206 may determine the delay by identifying areas where the communication apparatus 101 and the counterpart apparatus 102 are respectively located, based on Internet Protocol (IP) addresses of the communication apparatus 101 and the counterpart apparatus 102 or fully qualified domain names (FQDNs) of the communication apparatus 101 and the counterpart apparatus 102 that are acquired by reverse lookup.

The foregoing are not restrictive examples. In a case where the communication apparatus 101 and the counterpart apparatus 102 are both immobile apparatuses, a preset delay value may be used. Further, for example, in a case where the configuration is for Japan, etc., it is expected to access a fixed server located in Japan from Japan, so the delay may be set to a fixed value. In this case, while the delay is a fixed value, a bandwidth, which will be described below, is a variable. To reduce the processing load, the delay acquisition unit 206 may use the same delay value during a certain period of time instead of executing the delay measurement each time.

In step S402, the bandwidth acquisition unit 207 of the communication apparatus 101 acquires a bandwidth between the communication apparatus 101 and the counterpart apparatus 102. For example, the bandwidth acquisition unit 207 uses a wired bandwidth, a wireless bandwidth, a dynamically measured bandwidth, a preset bandwidth value, or a bandwidth acquired by making an inquiry to a relay apparatus existing on the network 100.

Further, the bandwidth acquisition unit 207 may acquire a bandwidth needed by a service executed between the communication apparatus 101 and the counterpart apparatus 102. For example, the bandwidth acquisition unit 207 may use a bandwidth necessary for moving-image streaming and voice call, a bandwidth calculated based on a contents size and the period of time up to the end of transmission/reception of contents, or a bandwidth that is predefined as a necessary bandwidth for the service.

Furthermore, in a case where an end-to-end bandwidth cannot be acquired due to the existence of a proxy or the like between the communication apparatus 101 and the counterpart apparatus 102, the bandwidth acquisition unit 207 may use a bandwidth of a part of the communication path as a bandwidth between the communication apparatus 101 and the counterpart apparatus 102. Since a bandwidth needed by an application at the time of a moving image streaming mode is different from a bandwidth needed by the same application at the time of an image thumbnail mode, the window size is set as appropriate to each mode.

In step S403, the determination unit 208 of the communication apparatus 101 calculates a band-delay product based on the delay acquired in step S401 and the bandwidth acquired in step S402 by use of Formula 1:

bandwidth (bps)×⅛ (byte conversion)×delay (ms)     (Formula 1).

The calculation formula specified as Formula 1 is a mere example, and a parameter such as a fluctuation in the delay or a change in the bandwidth may be included in the calculation of the band-delay product. The communication apparatus 101 may determine the band-delay product by, for example, referring to a table in which delays, bandwidths, and band-delay products are associated.

While the case of using the delay and the bandwidth is described in the present exemplary embodiment, this is not a limiting case. The calculation may be performed using a request of an application or middleware, or a window size needed by an application or middleware may be requested. Further, in a case where the cause of a bottleneck is something (application display speed, bus speed, memory size, CPU power, etc.) other than the delay or the bandwidth, if a change cannot be made to the cause, the determination unit 208 may include the cause as a constraint condition in the calculation. If a change can be made to the cause, a change request may be transmitted to make a change to the cause.

In step S404, the determination unit 208 determines a connection window size. In step S405, the determination unit 208 determines a stream window size. In the determination of such window sizes that satisfy the band-delay product in steps S404 and S405, the determination unit 208 may take into consideration a fluctuation, or the time up to the rendering of the application. Further, the determination unit 208 calculates a difference between a current window size and the determined optimum window size, and determines a window size for the transmission of WINDOW_UPDATE (refer to FIG. 5).

Figure 5:
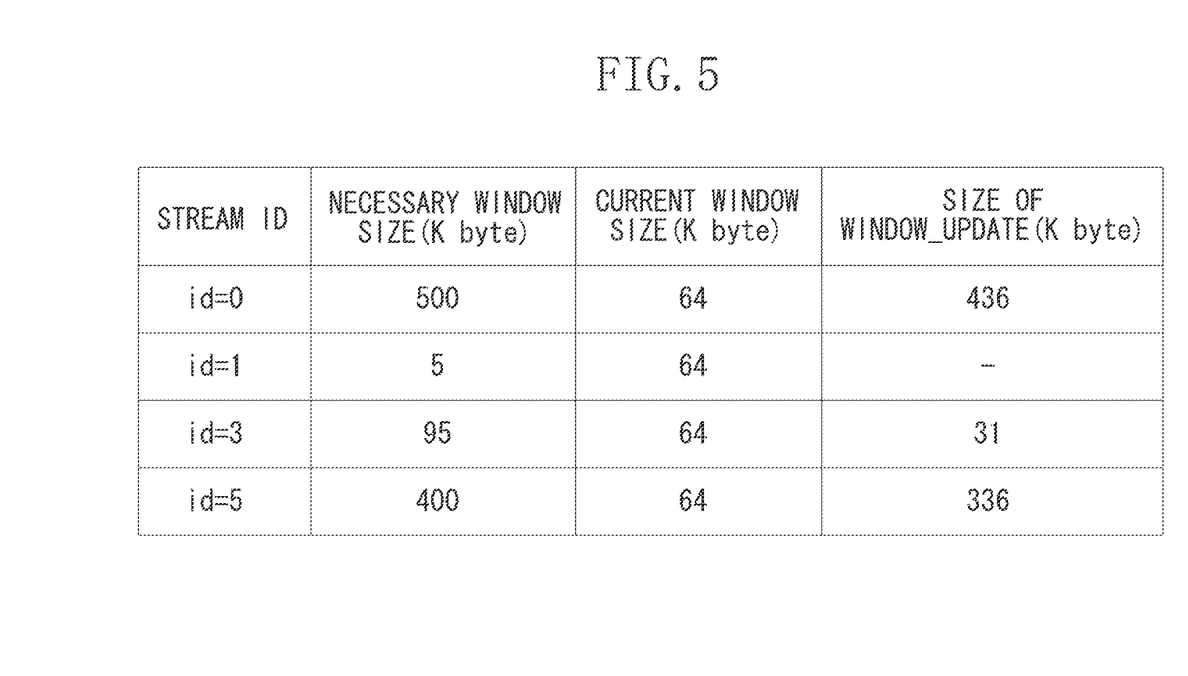
FIG. 5 illustrates an example of connection and stream window sizes.

FIG. 5 illustrates an example of connection and stream window sizes. In the example illustrated in FIG. 5, one connection includes three streams. For the purpose of description, a window size that satisfies a band-delay product, i.e., a window size that satisfies (band-delay product)≤ (window size), will be referred to as a necessary window size. As to stream identifiers (IDs), id=0 indicates a connection, and id=1, id=3, and id=5 indicate a stream, respectively. FIG. 5 illustrates an example of window sizes that are set in a case where the bandwidth is 100 Mbps and the delay is 40 ms.

As to the connection (id=0), a necessary window size of 500 kilobytes can be calculated using the calculation formula of Formula 1. As to the streams (id=1, id=3, and id=5), priorities are specified by the application, and bandwidths of 5, 95, and 400 kilobytes are assigned to the streams, respectively. The assignment to the respective streams may be performed using the priorities, or the application may preset the necessary bands or acquire the necessary bands from the counterpart apparatus 102. A current window size of each of the connection (id=0) and the streams (id=1, id=3, and id=5) is 64 kilobytes. While the current window size is set to 64 kilobytes in the present exemplary embodiment, the default value can be changed by setting an HTTP/2 SETTINGS frame.

A difference calculated by subtracting the current window size from the necessary window size is a window size that is a shortfall with respect to the necessary window size. In a case where the window size is insufficient, as in the cases of the connection (id=0) and the streams (id=3, and id=5), the updating of the window size by WINDOW_UPDATE is performed. In this example, the connection (id=0) and the streams (id=3) and (id=5) are 436 kilobytes, 31 kilobytes, and 336 kilobytes, respectively. On the other hand, in a case where the window size is sufficient, as in the case of the stream (id=1), the updating of the window size by WINDOW_UPDATE is not performed. After the transmission of WINDOW_UPDATE (WINDOW_UPDATE frame) by the update transmission unit 209, the current window size is changed to the window size transmitted by the update transmission unit 209.

In this way, the window size to be updated by WINDOW_UPDATE to satisfy the necessary window size can be determined. While the example in which only the parameters of the delay and the bandwidth are used is described in the present exemplary embodiment to simplify the description, calculation using a fluctuation may be performed as described above.

In a case where a memory for the necessary window size cannot be secured due to a constrain of the memory of the communication apparatus 101, a maximum window size for which a memory can be secured is set to the connection (id=0), and a window size that is increased for the streams is assigned to the respective streams (id=1, id=3, and id=5). The amount of data to be transmitted and received in HTTP/2 communication is determined by the connection, so that the connection window size and the stream window sizes do not necessarily have to match. The total amount of the stream window sizes is set larger than the connection window size to enable transmission through a stream available for the transmission with effective use of the connection window size. Further, in a case where it is known that a new stream is to be generated, a large connection window size may be assigned in advance. In this way, transmission of WINDOW_UPDATE at the time of generating a new stream can be decreased.

In step S406, the judgment unit 205 of the communication apparatus 101 judges whether to transmit a connection WINDOW_UPDATE. The judgment unit 205 checks information specified in the row of the stream ID that is id=0 in FIG. 5, and since there is a size of WINDOW_UPDATE (436 kilobytes), the judgment unit 205 judges to transmit a connection WINDOW_UPDATE (YES in step S406), and the processing proceeds to step S407. In step S407, the update transmission unit 209 of the communication apparatus 101 transmits a connection WINDOW_UPDATE to the counterpart apparatus 102. On the other hand, in step S406, if the judgment unit 205 judges to transmit no connection WINDOW_UPDATE (NO in step S406), the processing proceeds to step S408.

Further, in step S406, the judgment unit 205 also judges whether a resource such as a memory can be secured, besides the judgment as to whether there is a size of connection WINDOW_UPDATE. For example, if the judgment unit 205 judges that a sufficient resource such as a memory cannot be secured, a window size to be specified by WINDOW_UPDATE may be set within a range for which a resource such as a memory can be secured. To simplify the description, hereinafter, the present exemplary embodiment will be described based on the assumption that the judgment unit 205 judges that there is a sufficient resource such as a memory at the time of WINDOW_UPDATE.

In step S408, the judgment unit 205 judges whether to transmit a stream WINDOW_UPDATE. The judgment unit 205 checks information specified in the rows of the stream IDs that are id=1, id=3, and id=5 in FIG. 5. The judgment unit 205 judges to transmit WINDOW_UPDATEs of id=3 and id=5, each of which has a plus value of the WINDOW_UPDATE size (YES in step S408), and the processing proceeds to step S409. On the other hand, the judgment unit 205 judges to transmit no WINDOW_UPDATE of id=1, which has no WINDOW_UPDATE size (the WINDOW_UPDATE size is not a plus value) (NO in step S408). While there are three streams in the present exemplary embodiment, in a case where there is only the stream of id=1, the judgment unit 205 judges to transmit no stream WINDOW_UPDATE, and the processing ends.

In step S409, the update transmission unit 209 transmits to the counterpart apparatus 102 stream WINDOW_UPDATEs associated with the stream IDs that the judgment unit 205 judges to transmit a WINDOW_UPDATE. Then, the processing is ended.

Figure 6:
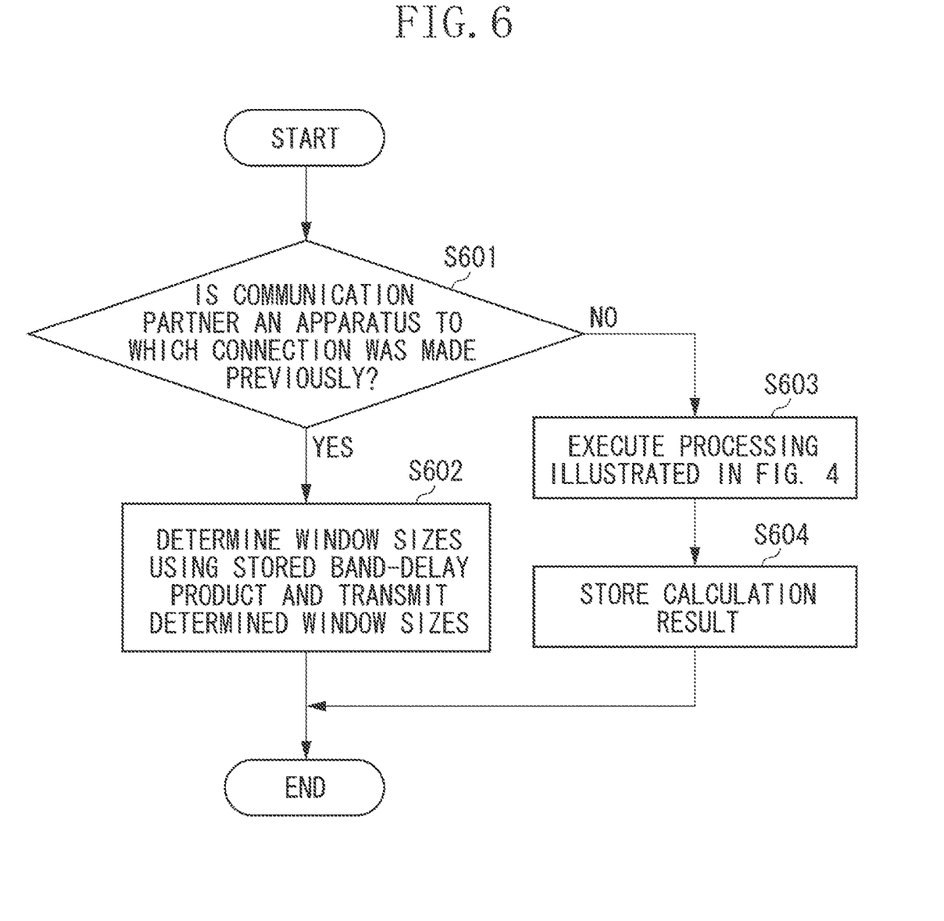
FIG. 6 is a flowchart illustrating an operation example of the communication apparatus according to an exemplary embodiment of the present invention.

FIG. 6 is a flowchart illustrating an operation example of the communication apparatus 101 according to the present exemplary embodiment. FIG. 6 illustrates an example of processing to be performed in a case where the counterpart apparatus 102 is a communication partner to which the communication apparatus 101 was connected previously and window size determination processing to be performed in the communication apparatus 101 is to be reduced.

In step S601, the HTTP processing unit 210 of the communication apparatus 101 judges whether the counterpart apparatus 102 is a counterpart apparatus to which an HTTP/2 connection was made previously. If the HTTP processing unit 210 judges that the counterpart apparatus 102 is a counterpart apparatus to which an HTTP/2 connection was made previously (YES in step S601), the processing proceeds to step S602. On the other hand, if the HTTP processing unit 210 judges that the counterpart apparatus 102 is not a counterpart apparatus to which an HTTP/2 connection was made previously (NO in step S601), the processing proceeds to step S603.

In step S602, the determination unit 208 determines a connection window size and a stream window size using band-delay products acquired and stored at the time of the previous connection to the counterpart apparatus 102. Thereafter, the update transmission unit 209 transmits a connection WINDOW_UPDATE and a stream WINDOW_UPDATE to the counterpart apparatus 102, as necessary.

In step S603, the communication apparatus 101 executes the processing illustrated in FIG. 4, and the processing proceeds to step S604. In step S604, band-delay products calculated in the processing performed in step S603 are stored, and the processing ends.

While the band-delay product is stored in the present exemplary embodiment, this is not a restrictive example. For example, delays and bandwidths may be stored and reused, or necessary window sizes may be stored and reused. Further, some of the foregoing parameters may be reused. Reuse of parameters acquired in a previous connection as described above can reduce the processing for the acquisition of a necessary window size and the processing for the determination.

Figure 7:
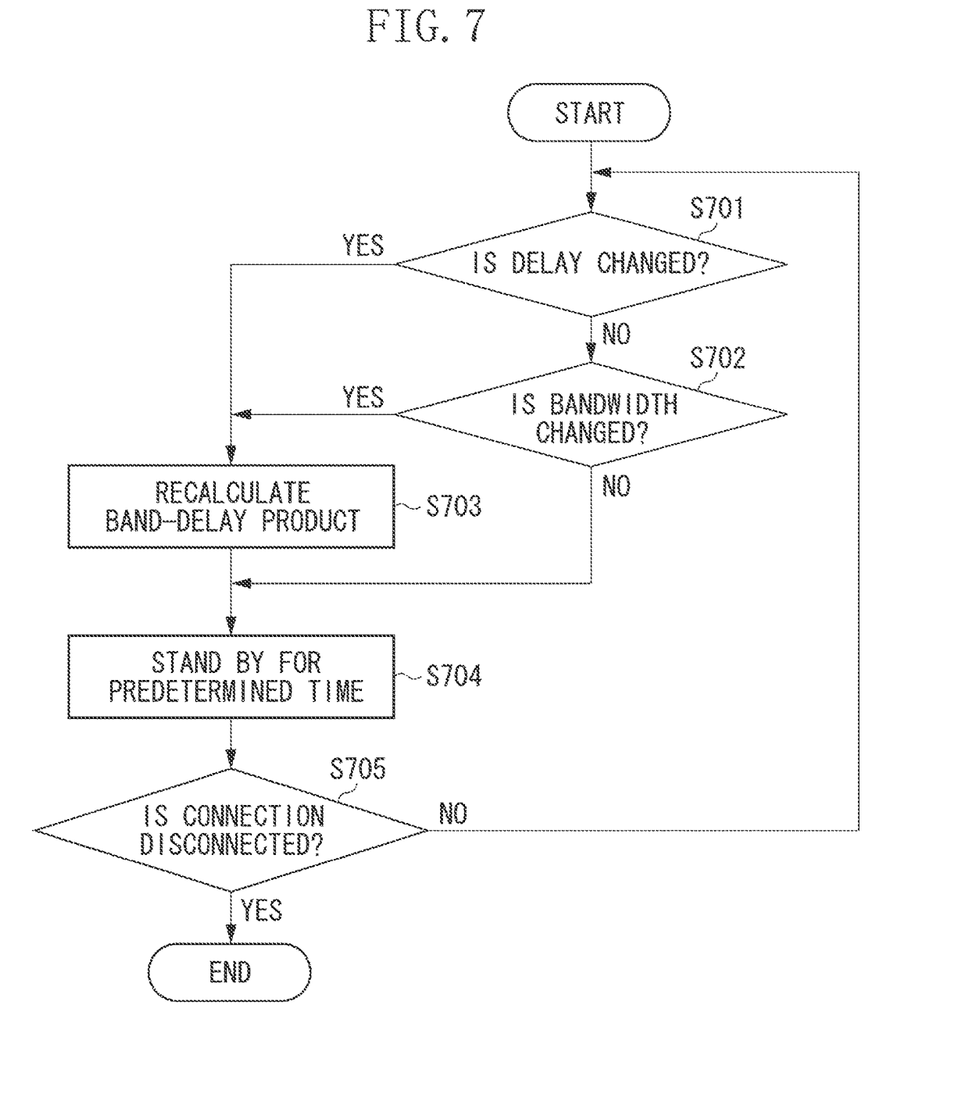
FIG. 7 is a flowchart illustrating an operation example of the communication apparatus according to an exemplary embodiment of the present invention.

FIG. 7 is a flowchart illustrating an operation example of the communication apparatus 101 according to the present exemplary embodiment. FIG. 7 illustrates an example of processing for the judgment as to whether to recalculate a window size.

In step S701, the delay acquisition unit 206 checks whether a delay between the communication apparatus 101 and the counterpart apparatus 102 is changed. If the delay acquisition unit 206 judges that the delay is changed (YES in step S701), the processing proceeds to step S703. On the other hand, if the delay acquisition unit 206 judges that the delay is not changed (NO in step S701), the processing proceeds to step S702.

In step S702, the bandwidth acquisition unit 207 checks whether a bandwidth between the communication apparatus 101 and the counterpart apparatus 102 is changed. If the bandwidth acquisition unit 207 judges that the bandwidth is changed (YES in step S702), the processing proceeds to step S703. On the other hand, if the bandwidth acquisition unit 207 judges that the bandwidth is not changed (NO in step S702), the processing proceeds to step S704.

In the judgments performed by the delay acquisition unit 206 and the bandwidth acquisition unit 207 in steps S701 and S702, respectively, the delay acquisition unit 206 or the bandwidth acquisition unit 207 may compare values and judge that the delay or bandwidth is changed, if a difference is equal to or larger than a predetermined level. Alternatively, the delay acquisition unit 206 or the bandwidth acquisition unit 207 may judge that the delay or bandwidth is changed, only if the necessary window size increases (only if the delay and the bandwidth increase).

In step S703, the determination unit 208 acquires a current delay and a current bandwidth from the delay acquisition unit 206 and the bandwidth acquisition unit 207, respectively, and recalculates a band-delay product. The band-delay product may be calculated using, for example, Formula 1 as in step S403 illustrated in FIG. 4.

In step S704, the HTTP processing unit 210 stands by for a certain period of time. The standby time may be a predefined time, or an interval may be changed according to the frequency of change in delay or bandwidth. In step S705, the HTTP processing unit 210 judges whether the connection to the counterpart apparatus 102 is disconnected. If the HTTP processing unit 210 judges that the HTTP connection is disconnected (YES in step S705), the processing ends. On the other hand, if the HTTP processing unit 210 judges that the HTTP connection is still connected (NO in step S705), the processing returns to step S701.

In this way, the window sizes can be recalculated in the communication apparatus 101 being in operation, and WINDOW_UPDATE suitable for a changing parameter can be transmitted. The communication apparatus 101 can perform communication without securing an unnecessary resource while a window size satisfying a band-delay product is secured. While the example in which the delay and the band are checked is described in the present exemplary embodiment to simplify the description, this is not a restrictive example. The exemplary embodiment of the present invention is also applicable to a case where the cause of a change in window size is changed, such as a fluctuation, a change in a request of an application, a memory, etc.

The following describes an example of communication operations performed between the communication apparatus 101 and the counterpart apparatus 102 according to the present exemplary embodiment.

<Case where Contents are Acquired by HTTP GET Method>

Figure 8:
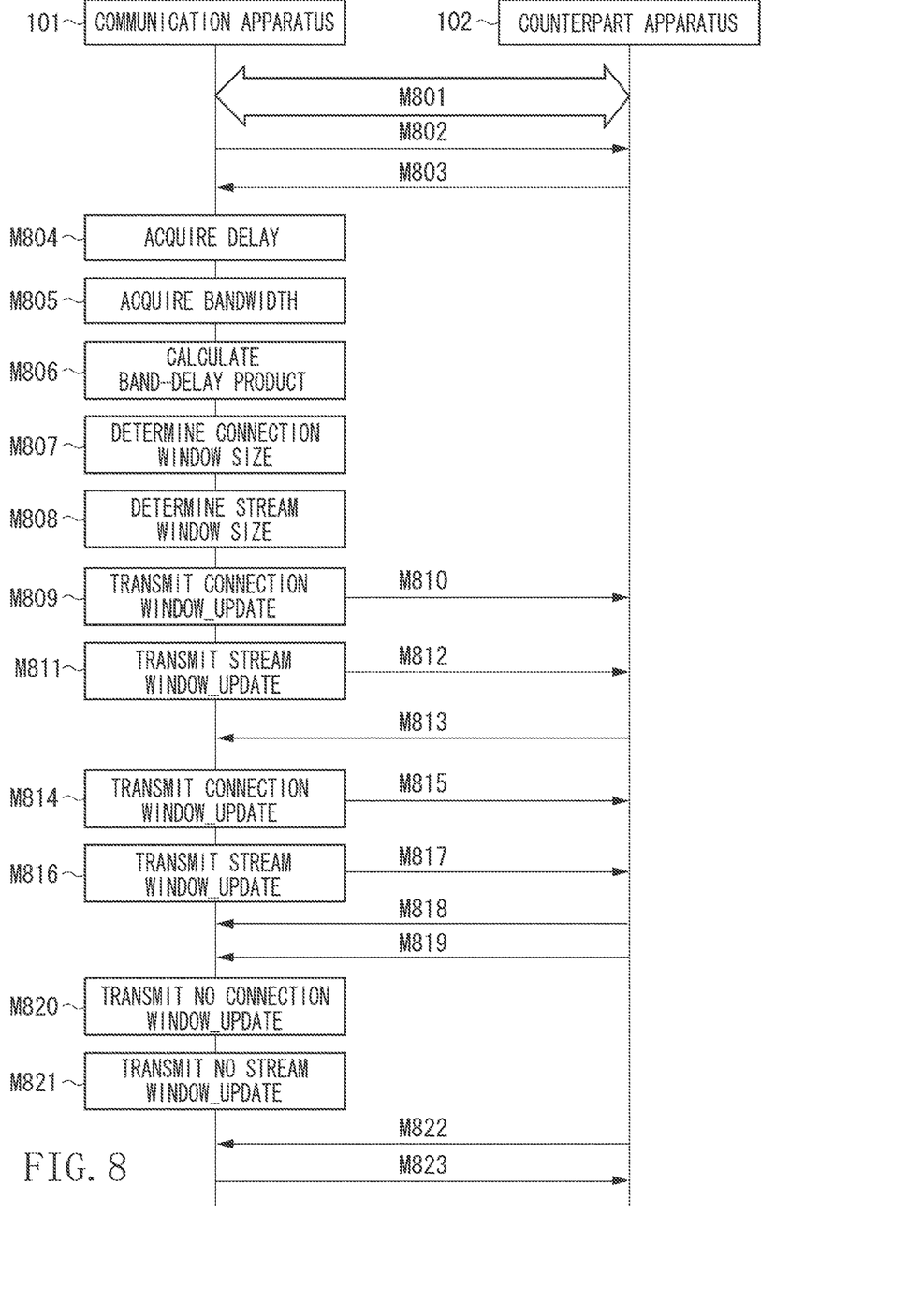
FIG. 8 illustrates a communication operation example to be performed between the communication apparatus and a counterpart apparatus according to an exemplary embodiment of the present invention.

FIG. 8 illustrates an example of a sequence of a case where acquisition of contents is performed by HTTP GET method between the communication apparatus 101 and the counterpart apparatus 102 according to the present exemplary embodiment. To simplify the description, only the stream of id=5 will be described below. A case where there are the streams of id=1 and id=3 is different in that stream WINDOW_UPDATEs corresponding to the respective stream IDs are transmitted. The connection window size may be transmitted periodically or may be transmitted at each total value of stream WINDOW_UPDATEs, or at the time of transmitting each stream WINDOW_UPDATE.

In M801, the communication apparatus 101 establishes a Transport Layer Security (TLS) connection to the counterpart apparatus 102, and upgrades the protocol from HTTP/1.1 to HTTP/2. Then, in M802, the communication apparatus 101 transmits an HTTP GET message with a HEADERS frame to the counterpart apparatus 102. In M803, the counterpart apparatus 102 transmits 200 OK, which is a response to the HTTP GET message, with a HEADERS frame to the communication apparatus 101.

In M804, the communication apparatus 101 acquires a delay between the communication apparatus 101 and the counterpart apparatus 102. In M805, the communication apparatus 101 acquires a bandwidth between the communication apparatus 101 and the counterpart apparatus 102. Then, in M806, the communication apparatus 101 calculates a band-delay product between the communication apparatus 101 and the counterpart apparatus 102 by use of the acquired delay and the acquired bandwidth.

In M807, the communication apparatus 101 determines the connection window size of the HTTP/2 connection connected between the communication apparatus 101 and the counterpart apparatus 102. Further, in M808, the communication apparatus 101 determines the stream window size of a stream for the communication on the HTTP/2 connection connected between the communication apparatus 101 and the counterpart apparatus 102.

In M809, the communication apparatus 101 judges whether to transmit a connection WINDOW_UPDATE to the counterpart apparatus 102. If the communication apparatus 101 judges to transmit a connection WINDOW_UPDATE, then in M810, the communication apparatus 101 transmits a connection WINDOW_UPDATE to the counterpart apparatus 102. Further, in M811, the communication apparatus 101 judges whether to transmit a stream WINDOW_UPDATE to the counterpart apparatus 102. If the communication apparatus 101 judges to transmit a stream WINDOW_UPDATE to the counterpart apparatus 102, then in M812, the communication apparatus 101 transmits a stream WINDOW_UPDATE to the counterpart apparatus 102.

Then, in M813, the communication apparatus 101 receives an HTTP body portion, which is a response to the HTTP GET message, from the counterpart apparatus 102. For example, the communication apparatus 101 receives image contents from the counterpart apparatus 102.

When the communication apparatus 101 receives the HTTP body portion from the counterpart apparatus 102, the window size decreases (the current window size specified in FIG. 5 is decreased by the data size). In M814, the communication apparatus 101 determines a connection window size again and judges whether to transmit a connection WINDOW_UPDATE. If the communication apparatus 101 judges to transmit a connection WINDOW_UPDATE, then in M815, the communication apparatus 101 transmits a connection WINDOW_UPDATE to the counterpart apparatus 102.

Further, in M816, the communication apparatus 101 determines a stream window size again and judges whether to transmit a stream WINDOW_UPDATE. If the communication apparatus 101 judges to transmit a stream WINDOW_UPDATE, then in M817, the communication apparatus 101 transmits a stream WINDOW_UPDATE to the counterpart apparatus 102.

While the determination is performed again using the stored band-delay products according to the processing illustrated in FIG. 6 in the present exemplary embodiment, this is not a limiting case. The acquisition of a delay and a bandwidth may be performed again as in the processing illustrated in FIG. 7. Whether to change to the processing illustrated in FIG. 6 or to the processing illustrated in FIG. 7 does not have to be checked every time, and the processing illustrated in FIG. 6 and the processing illustrated in FIG. 7 may be switched at a certain time or every certain number of times.

In M818, the communication apparatus 101 receives a continued HTTP body portion from the counterpart apparatus 102. In M819, the communication apparatus 101 receives a further continued HTTP body portion from the counterpart apparatus 102.

In M820, the communication apparatus 101 determines the connection window size again and judges whether to transmit a connection WINDOW_UPDATE. In the present exemplary embodiment, the communication apparatus 101 judges to transmit no connection WINDOW_UPDATE to the counterpart apparatus 102. Further, in M821, the communication apparatus 101 judges to transmit no stream WINDOW_UPDATE to the counterpart apparatus 102. For example, the communication apparatus 101 can judge to transmit no WINDOW_UPDATE if the judgment unit 205 judges that a window size that satisfies the band-delay product is still assigned. Further, the communication apparatus 101 can judge to transmit no WINDOW_UPDATE, if the contents length is known from ContentLength contained in the HTTP header and a window size that is sufficient enough is already assigned.

While two messages are received in M818 and M819 in the foregoing example, this is not a restrictive example. Alternatively, the processing may proceed to M820 and M821 once one message is received (only in M818). Further, in a case where the judgment unit 205 judges that the window size still has a margin or in a case where the determination unit 208 determines the window size with a margin in advance, the processing may proceed to M820 and M821 at the reception of not two but three or more messages.

Then, in M822, the communication apparatus 101 receives the rest of the HTTP body portion and END STREAM from the counterpart apparatus 102. The communication apparatus 101 displays the acquired image contents using, for example, the display unit 202. The display unit 202 may display not only image contents but also HTTP headers, etc. Further, the display unit 202 may display a connection error that occurred during the transmission and reception.

The communication apparatus 101 does not transmit a WINDOW_UPDATE in a case where the connection between the communication apparatus 101 and the counterpart apparatus 102 is disconnected, but in a case where the connection is not disconnected, the communication apparatus 101 may transmit a connection WINDOW_UPDATE to the counterpart apparatus 102 in M823 after M822. In this way, WINDOW_UPDATE at the time of generating a new stream is transmitted in advance so that the speed increases.

The connection WINDOW_UPDATE may be transmitted alone or may collectively be processed at the time of updating connection WINDOW_UPDATE generated during the processing of another stream.

<Case where Contents are Uploaded by HTTP PUT Method>

Figure 9:
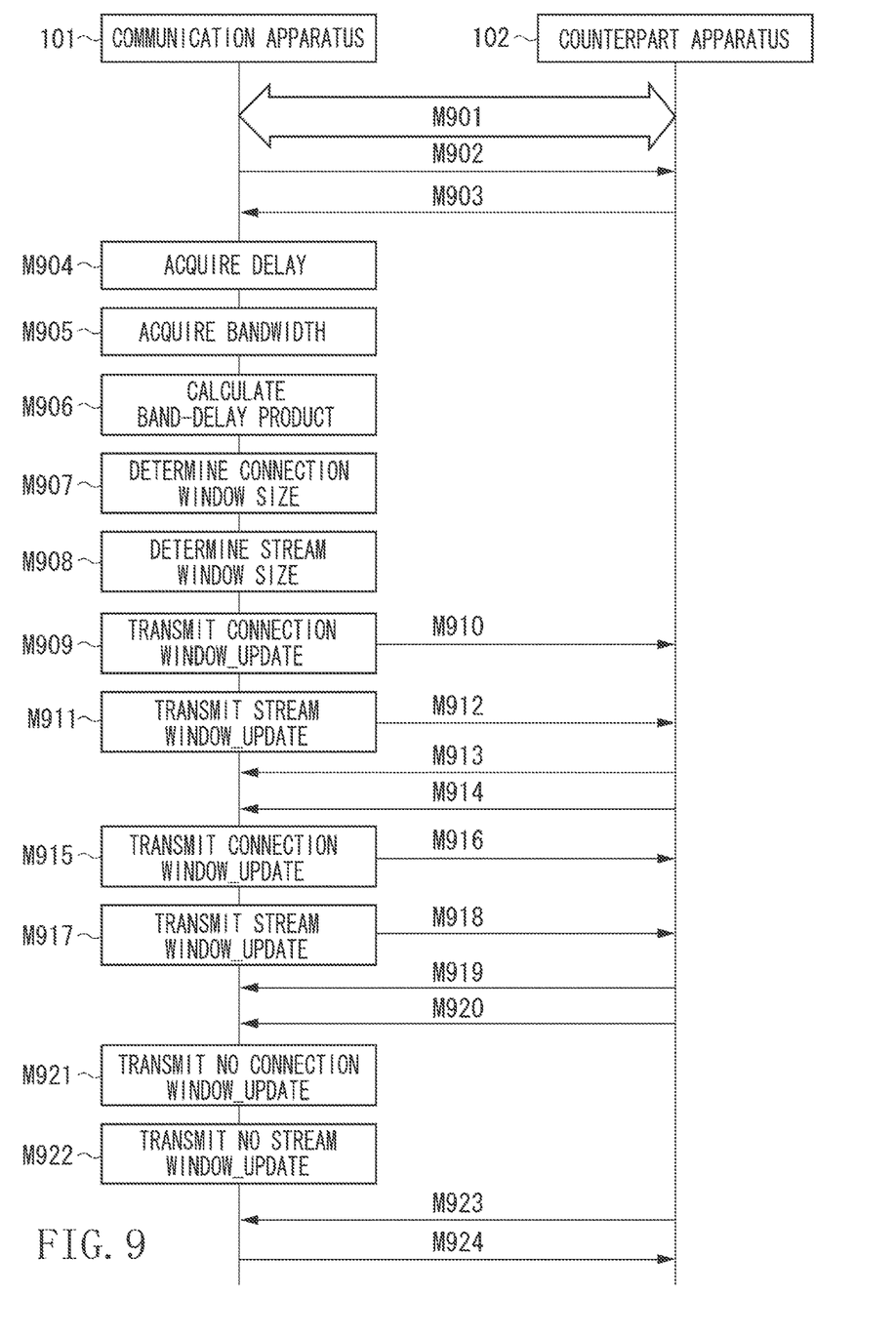
FIG. 9 illustrates a communication operation example to be performed between the communication apparatus and the counterpart apparatus according to an exemplary embodiment of the present invention.

FIG. 9 illustrates an example of a sequence of a case where the counterpart apparatus 102 uploads contents to the communication apparatus 101 by HTTP PUT method according to the present exemplary embodiment.

In M901, the communication apparatus 101 establishes a TLS connection to the counterpart apparatus 102, and upgrades the protocol from HTTP/1.1 to HTTP/2. Then, in M902, the counterpart apparatus 102 transmits to the communication apparatus 101 an HTTP PUT message with a HEADERS frame containing 100-continue in the Expect header. In M903, the counterpart apparatus 102 transmits 100 CONTINUE, which is a provisional response to the HTTP PUT message, with a HEADERS frame to the communication apparatus 101.

In this way, the communication apparatus 101 notifies the counterpart apparatus 102 that the communication apparatus 101 is to receive transmission of contents from the counterpart apparatus 102. In a case where the communication apparatus 101 cannot receive the upload of contents by HTTP PUT method from the counterpart apparatus 102, the communication apparatus 101 returns an error, and the processing ends. M904 to M912 are similar to M804 to M812 illustrated in FIG. 8, so description of M904 to M912 is omitted.

In M913, the communication apparatus 101 receives a body portion of the HTTP PUT message from the counterpart apparatus 102. In M914, the communication apparatus 101 receives a continued HTTP body portion from the counterpart apparatus 102. For example, the body portion of the HTTP PUT message contains image contents. M915 to M918 are similar to M814 to M817 illustrated in FIG. 8, so description of M915 to M918 is omitted.

In M919, the communication apparatus 101 receives a continued HTTP body portion from the counterpart apparatus 102. In M920, the communication apparatus 101 receives a further continued HTTP body portion from the counterpart apparatus 102. M921 and M922 are similar to M820 and M821 illustrated in FIG. 8, so description of M921 and M922 is omitted.

In M923, the communication apparatus 101 receives the rest of the HTTP body portion from the counterpart apparatus 102. In M924, the communication apparatus 101 transmits HTTP 200 OK and END STREAM to the counterpart apparatus 102. The communication apparatus 101 may display, for example, contents uploaded from the counterpart apparatus 102 by use of the display unit 202. The display unit 202 may display not only image contents but also HTTP headers, etc. Further, the display unit 202 may display connection errors that occurred during the transmission and reception.

As described, the present exemplary embodiment enables effective use of bandwidths and resources in the communication between the communication apparatus 101 and the counterpart apparatus 102. The communication apparatus 101 transmits a WINDOW_UPDATE before receiving an HTTP body portion so that the window size can be increased before the HTTP body portion is received, whereby the throughput increases.

While the HTTP/2 window size is changed in the present exemplary embodiment, a band-delay product may further be combined with a buffer size of a protocol of another layer such as TCP. In this way, a communication apparatus performing HTTP/2 communication can reduce a decrease in speed that is caused by insufficient buffer size in another layer. Further, in a case where a resource, such as a memory, is insufficient, the resource may be assigned equally to the HTTP/2 window size and protocols of other layers instead of assigning the resource only to the HTTP/2 window size, so that the performance can be improved.

While the foregoing describes the HTTP GET message and the HTTP PUT message as examples, these are not restrictive examples. An exemplary embodiment of the present invention is also applicable to cases of other HTTP methods in which a body portion is contained (POST method, etc.). Moreover, while the foregoing describes the HTTP processing as an example, this is not a restrictive example. An exemplary embodiment of the present invention is also applicable to a protocol for transmission control in request-response communication.

According to the present exemplary embodiment, in a case where, for example, a requested bandwidth (24 Mbps) of moving image streaming is set, the communication apparatus 101 can receive contents data at high speed with a suitable window size. In this way, the buffering time of the moving image streaming at the rise can be decreased. Further, a decrease in performance (noise, slow start, drop frame, etc.) due to a lack of the requested bandwidth at the start of the moving image streaming before the transmission of WINDOW_UPDATE can be decreased. Furthermore, since the window size is not excessively increased, a decrease in performance as a product can be reduced without burdening a memory of an application (e.g., image processing or a user interface) other than communication control.

Figure 10:
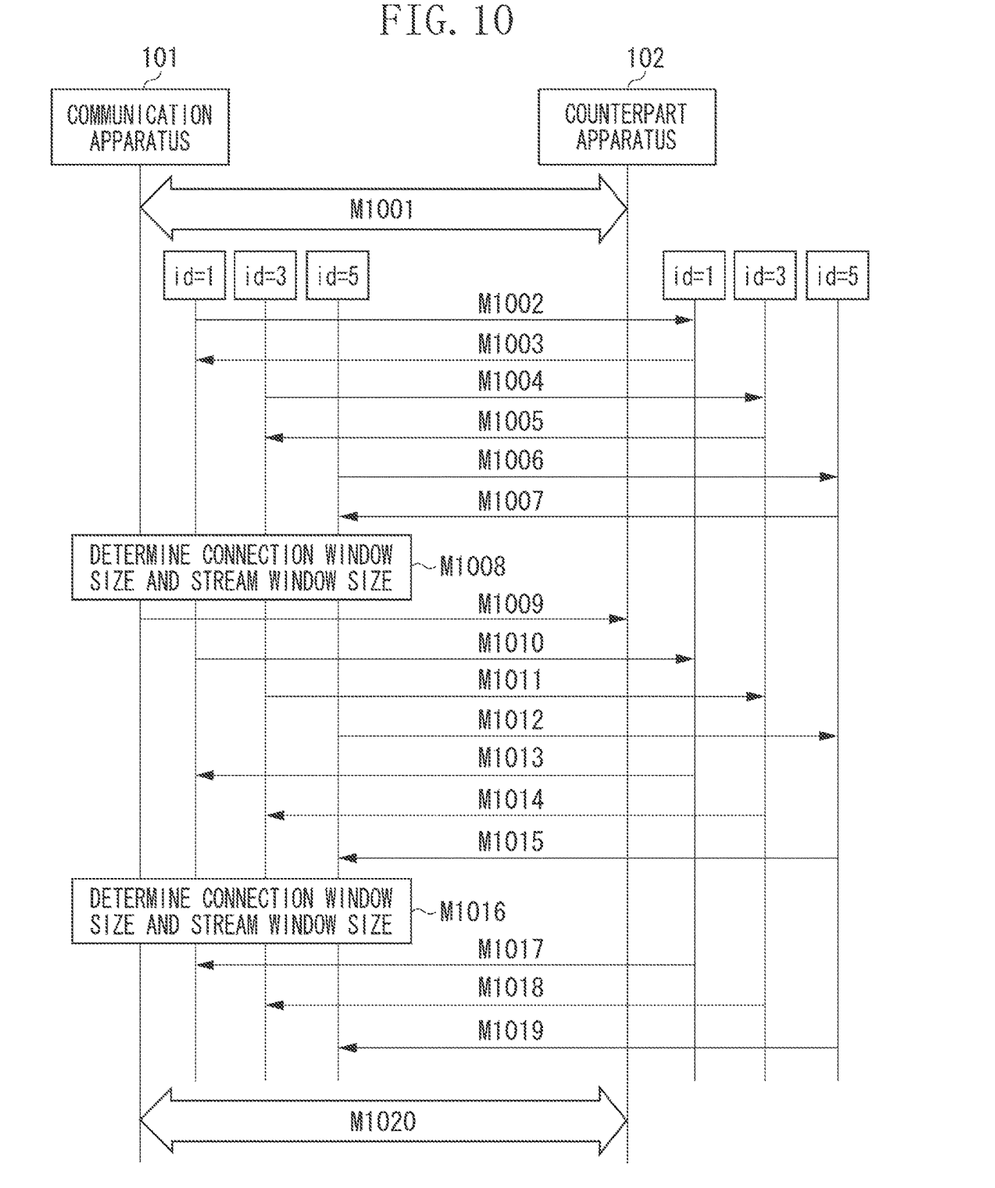
FIG. 10 illustrates a communication operation example to be performed between the communication apparatus and the counterpart apparatus according to an exemplary embodiment of the present invention.

The following describes a case where a plurality of streams is processed on a single connection between the communication apparatus 101 and the counterpart apparatus 102. FIG. 10 illustrates an example of a sequence of a case where the communication apparatus 101 acquires contents from the counterpart apparatus 102 with a plurality of HTTP GET messages according to the present exemplary embodiment.

In M1001, the communication apparatus 101 establishes a TLS connection to the counterpart apparatus 102, and upgrades the protocol from HTTP/1.1 to HTTP/2. Then, the communication apparatus 101 starts three streams (id=1, id=3, and id=5) on the connection between the communication apparatus 101 and the counterpart apparatus 102.

In M1002, the communication apparatus 101 transmits an HTTP GET message to the counterpart apparatus 102 by use of a stream 1 (hereinafter, a stream in a case where id=1 will be referred to as "stream 1") to acquire image contents. In M1003, the communication apparatus 101 receives a 200 OK response from the counterpart apparatus 102. Further, in M1004, the communication apparatus 101 transmits an HTTP GET message to the counterpart apparatus 102 by use of a stream 3 (hereinafter, a stream in a case where id=3 will be referred to as "stream 3") to acquire image contents. In M1005, the communication apparatus 101 receives a 200 OK response from the counterpart apparatus 102. Furthermore, in M1006, the communication apparatus 101 transmits an HTTP GET message to the counterpart apparatus 102 by use of a stream 5 (hereinafter, a stream in a case where id=5 will be referred to as "stream 5") to acquire image contents. In M1007, the communication apparatus 101 receives a 200 OK response from the counterpart apparatus 102.

Then, in M1008, the communication apparatus 101 determines the connection window size and the stream window sizes. In this example, the connection window size and the plurality of stream window sizes are collectively determined to reduce the amount of common processing such as the calculation of a band-delay product. Alternatively, only a part of the processing of the determination of the connection window size and the plurality of stream window sizes may be executed collectively. For example, only the processing of the streams 1, 3, and 5 may be executed collectively.

In M1009, the communication apparatus 101 transmits a connection WINDOW_UPDATE. Further, in M1010 to M1012, the communication apparatus 101 transmits stream WINDOW_UPDATEs for the streams 1, 3, and 5, respectively. While the communication apparatus 101 transmits the stream WINDOW_UPDATEs after the connection WINDOW_UPDATE in the foregoing example, this is not a restrictive example. The stream WINDOW_UPDATEs may be transmitted first. Alternatively, there may be a case where a judgment to transmit no WINDOW_UPDATE is made.

In M1013 to M1015, the communication apparatus 101 receives HTTP body portions of the streams 1, 3, and 5 from the counterpart apparatus 102. Then, in M1016, the communication apparatus 101 determines the connection window size and the stream window sizes. In the present exemplary embodiment, the communication apparatus 101 judges to transmit neither a connection WINDOW_UPDATE nor WINDOW_UPDATEs for the streams 1, 3, and 5.

For example, in a case where the stream 1 is a Hypertext Markup Language (HTML) index and two images are being downloaded through the streams 3 and 5 (in the case of this example, the body portion of the stream 1 has been acquired prior to the start of the streams 3 and 5), since the HTML index does not involve other images or acquisition from a resource, the connection between the communication apparatus 101 and the counterpart apparatus 102 ends. No new stream is to be generated after the stream 5, so it can be judged that WINDOW_UPDATE does not have to be transmitted. As the foregoing describes, the judgment as to whether to transmit a WINDOW_UPDATE from an application can be performed.

For another example, in a case where a list of image contents has been already acquired and an application acquires three contents (streams 1, 3, and 5), no new stream is to be generated. Accordingly, it can be judged that WINDOW_UPDATE does not have to be transmitted.

In M1017 to M1019, the communication apparatus 101 receives the rest of the HTTP body portion of each of the streams 1, 3, and 5 and END STREAM from the counterpart apparatus 102. In M1020, the communication apparatus 101 disconnects the HTTP/2 connection between the communication apparatus 101 and the counterpart apparatus 102, and then disconnects the TLS connection.

As described above, the example illustrated in FIG. 10 can reduce window size determining processing in the case where a plurality of streams is executed. Further, execution of the judgment as to whether to transmit WINDOW_UPDATE in response to a request from an application can reduce the overhead of the WINDOW_UPDATE transmission processing. While FIG. 10 is illustrated based on the example illustrated in FIG. 8, application to the example illustrated in FIG. 9 is also possible.

The disclosed exemplary embodiments illustrate mere examples of implementation of the invention, and the technical scope of the invention should not be interpreted restrictively to the disclosed exemplary embodiments. In other words, an exemplary embodiment of the present invention can be implemented in various forms without departing from the technical spirit or principal feature of the invention.

A configuration of an exemplary embodiment of the present invention enables communication with effective use of a band in a case where the communication is performed using a connection and a stream.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-159483, filed Aug. 12, 2015, which is hereby incorporated by reference herein in its entirety.

What is claimed is:

1. A communication apparatus comprising:
   at least one hardware processor; and
   a memory which stores instructions executable by the at least one hardware processor to cause the communication apparatus to perform at least:
   establishing a connection for communication with another communication apparatus;
   establishing at least one stream based on the connection for communication with the another communication apparatus;
   determining, by using communication information associated with speed of communication between the communication apparatus and the another communication apparatus, a first window size corresponding to a size of a buffer for communication through the connection with the another communication apparatus and a second window size corresponding to a size of a buffer for communication through a stream of the at least one stream with the another communication apparatus;
   deciding, based on the first window size determined by using the communication information associated with the speed of communication between the communication apparatus and the another communication apparatus, transmission timing of a first control frame for controlling a size of data to be transmitted from the another communication apparatus through the connection;

transmitting, according to the transmission timing decided, the first control frame generated based on the first window size determined; and transmitting a second control frame for controlling a size of data to be transmitted from the another communication apparatus through the stream, wherein the second control frame is generated based on the second window size determined.

2. The communication apparatus according to claim 1, wherein the instructions further cause the communication apparatus to perform:

deciding, based on the second window size determined by using the communication information associated with the speed of communication between the communication apparatus and the another communication apparatus, transmission timing of the second control frame.

3. The communication apparatus according to claim 2, wherein the transmission timing of the second control frame decided in a case where the second window size is larger than a preset window size of the stream is earlier than the transmission timing of the second control frame decided in a case where the second window size determined is smaller than the preset window size of the stream.

4. The communication apparatus according to claim 1, wherein the transmission timing of the first control frame decided in a case where the first window size determined is larger than a preset window size of the connections earlier than the transmission timing of the first control frame decided in a case where the first window size determined is smaller than the preset window size of the connection.

5. The communication apparatus according to claim 4, wherein, in a case where the first window size determined is larger than the preset window size of the connection, the first control frame is transmitted before the communication apparatus receives a body of a HTTP message from the another communication apparatus through the connection, and wherein, in a case where the first window size determined is smaller than the preset window size of the connection, the first control frame is transmitted after the communication apparatus receives at least a specific amount of body of a HTTP message from the another communication apparatus through the connection, wherein the specific amount is determined based on the first window size.

6. The communication apparatus according to claim 1, wherein the communication information includes at least one of a bandwidth and a delay of a communication path between the communication apparatus and the another communication apparatus.

7. The communication apparatus according to claim 1, wherein the communication information includes a bandwidth and a delay of a communication path between the communication apparatus and the another communication apparatus, and wherein the first window size and the second window size are determined based on a band-delay product calculated based on the bandwidth and the delay.

8. The communication apparatus according to claim 1, wherein the first control frame and the second control frame are generated according to a frame format defined by HTTP/2.

9. The communication apparatus according to claim 1, wherein the first control frame and the second control frame are WINDOW_UPDATE frames defined by HTTP/2.

10. The communication apparatus according to claim 1, wherein the second control frame is a SETTINGS frame defined by HTTP/2.

11. The communication apparatus according to claim 1, wherein a TCP connection is established as the connection, and wherein a HTTP/2 stream based on the TCP connection is established as the stream.

12. The communication apparatus according to claim 1, wherein the first control frame indicates a size of data that the another communication apparatus can transmit in addition to an existing window of the connection, and wherein the second control frame indicates a size of data that the another communication apparatus can transmit in addition to an existing window of the stream.

13. A communication method to be performed by a communication apparatus, the communication method comprising:

establishing a connection for communication with another communication apparatus;

establishing at least one stream based on the connection for communication with the another communication apparatus;

determining, by using communication information associated with speed of communication between the communication apparatus and the another communication apparatus, a first window size corresponding to a size of a buffer for communication through the connection with the another communication apparatus and a second window size corresponding to a size of a buffer for communication through a stream of the at least one stream with the another communication apparatus;

deciding, based on the determined first window size determined by using the communication information associated with the speed of communication between the communication apparatus and the another communication apparatus, transmission timing of a first control frame for controlling a size of data to be transmitted from the another communication apparatus through the connection;

transmitting, according to the transmission timing decided, the first control frame generated based on the first window size determined; and transmitting a second control frame for controlling a size of data to be transmitted from the another communication apparatus through the stream, wherein the second control frame is generated based on the second window size determined.

14. A communication system in which a first communication apparatus and a second communication apparatus are connected to each other via a network, the first communication apparatus comprising:

a connection establishment unit configured to establish a connection for communication between the first communication apparatus and the second communication apparatus;

a stream establishment unit configured to establish at least one stream based on the connection for communication between the first communication apparatus and the second communication apparatus;

a determination unit configured to determine, by using communication information associated with speed of communication between the first communication apparatus and the second communication apparatus, a first window size corresponding to a size of a buffer for communication through the connection and a second window size corresponding to a size of a buffer for communication through a stream of the at least one stream;

a decision unit configured to decide, based on the first window size determined by the determination unit by using the communication information associated with the speed of communication between the communication apparatus and the another communication apparatus, transmission timing of a first control frame for controlling a size of data to be transmitted from the second communication apparatus through the connection; and a first transmission unit configured to transmit, according to the transmission timing decided, the first control frame generated based on the first window size determined and transmit a second control frame for controlling a size of data to be transmitted from the another communication apparatus through the stream, wherein the second control frame is generated based on the second window size determined by the generation unit, and the second communication apparatus comprising:

a receiving unit configured to receive the first control frame and the second control frame transmitted by the first transmission unit; and a second transmission unit configured to transmit data to the first communication apparatus through the stream based on the connection according to the first control frame and the second control frame received by the receiving unit.

15. A computer-readable storage medium storing a computer program for causing a computer to execute a communication method, the method comprising:

establishing a connection for communication with another communication apparatus;

establishing at least one stream based on the connection for communication with the another communication apparatus;

determining, by using communication information associated with speed of communication between the communication apparatus and the another communication apparatus, a first window size corresponding to a size of a buffer for communication through the connection with the another communication apparatus and a second window size corresponding to a size of a buffer for communication through a stream of the at least one stream with the another communication apparatus;

deciding, based on the determined first window size by using the communication information associated with the speed of communication between the communication apparatus and the another communication apparatus, transmission timing of a first control frame for controlling a size of data to be transmitted from the another communication apparatus through the connection;

transmitting, according to the transmission timing decided, the first control frame generated based on the first window size determined; and transmitting a second control frame for controlling a size of data to be transmitted from the another communication apparatus through the stream, wherein the second control frame is generated based on the second window size determined.

* * * * *